(No Model.)
L. N. LEAN.
MILK COOLER.
No. 526,239. Patented Sept. 18, 1894.
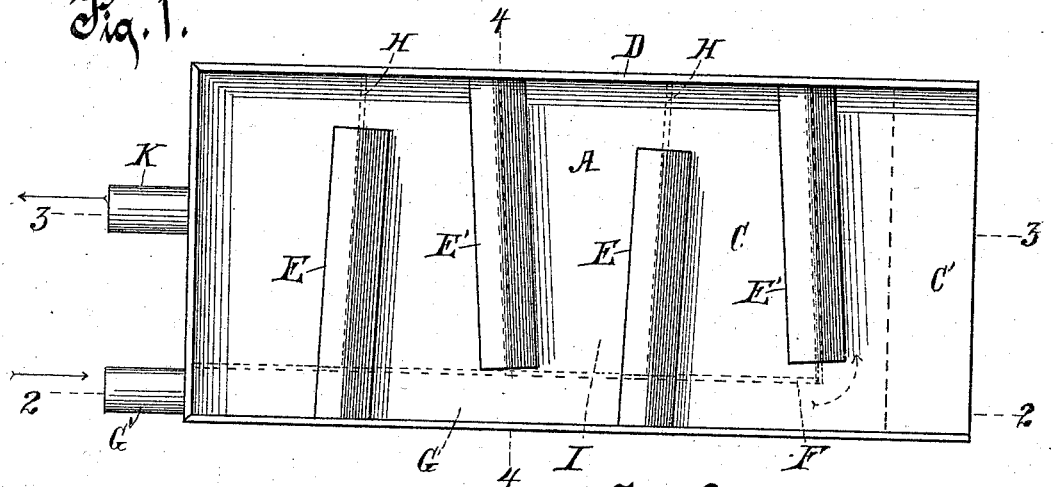
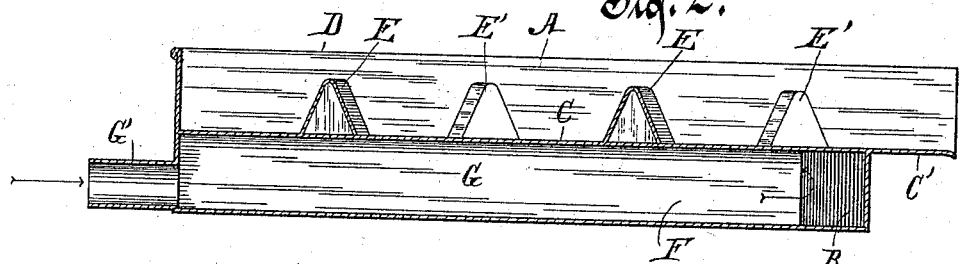
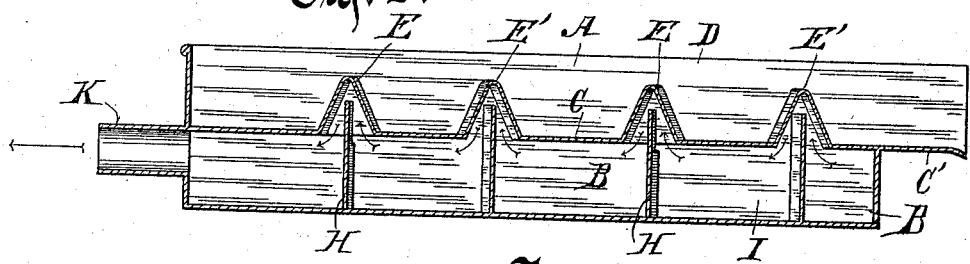
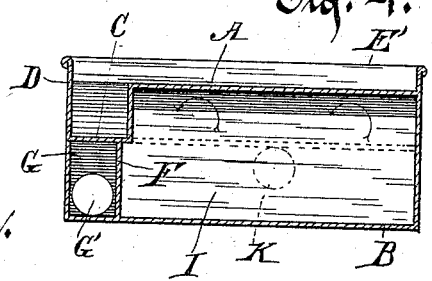
Witnesses:
Inventor.
Lewis N. Lean
By Bendict Morsell
Attorneys.

UNITED STATES PATENT OFFICE.

LEWIS N. LEAN, OF PALMYRA, WISCONSIN.

MILK-COOLER.

SPECIFICATION forming part of Letters Patent No. 526,239, dated September 18, 1894.

Application filed July 9, 1894. Serial No. 516,894. (No model.)

*To all whom it may concern:*

Be it known that I, LEWIS N. LEAN, of Palmyra, in the county of Jefferson and State of Wisconsin, have invented a new and useful Improvement in Milk or Cream Coolers, of which the following is a description, reference being had to the accompanying drawings, which are a part of this specification.

The object of my invention is to provide means for cooling milk or cream, which means are embodied in a device or apparatus of simple and inexpensive construction, and in which a maximum of result is obtainable in a small device, or in one of other prescribed dimensions.

The invention consists of the device and its parts and combinations, as hereinafter described and claimed, or their equivalents. Nothing herein stated is to be construed as depriving me of my right to protection hereunder for equivalent devices, and of the right to use these devices and their equivalents for every purpose for which they are adapted, notwithstanding no mention of such equivalents is herein otherwise made.

In the drawings, Figure 1, is a top plan view of my improved milk or cream cooler. Fig. 2, is a longitudinal, vertical section on line 2—2 of Fig. 1. Fig. 3, is a longitudinal, vertical section on line 3—3 of Fig. 1. Fig. 4, is a transverse vertical section on line 4—4 of Fig. 1.

My improved milk or cream cooler is preferably constructed of metal, and for ordinary use, the sheet tin of commerce is on account of its inexpensiveness, desirable and satisfactory.

The device is conveniently made of oblong form having a pan or tray A above, and a suitably partitioned water chamber or receptacle B below. The floor C of the tray covers the chamber B and is secured water tight to the top edges of the walls of the chamber. This floor C projects at one end beyond the chamber B and forms an apron C' adapted for the discharge of the milk or cream from the tray, at a distance from the side of the chamber B. The walls D inclose three sides of the tray and project along the side edges of the apron C' to its extremity. The tray, being thus without one end wall, is adapted to receive milk or cream at the other or front end, which runs over the bottom of the tray longitudinally and is discharged at the tail over the apron C'. The tray is provided with wing dams E E' projecting up from the bottom C and extending alternately from one side or the other of the tray nearly across it, so that milk or cream poured into the tray near the front end, runs across the tray first in one direction and then in the opposite direction and around the dams to the other extremity of the tray, from which it is discharged over the apron C'. These dams consist of water tight hoods over apertures cut in the floor C and are preferably inversely V-shaped in cross-section.

In the water chamber B there is a longitudinal partition F which is located at a little distance from and parallel to one side of the chamber, and extends from the front end of the chamber nearly to the rear end, and is secured water tight at its front end and along its top and bottom edges to the respective walls of the chamber. A duct G is thus formed in the water chamber for the passage of the water, that flows inwardly through the port G', to the rear end of the chamber. Other partitions or dams H extend across the chamber B from the partition F to the more distant side wall of the chamber and are secured water tight to the bottom, to the side wall D, and to the partition F. These dams are located in the line of the axes of the wing dams E and E', and extend up nearly to the floor C and into the spaces beneath the wing dams nearly to their tops, so that water coming against a dam H is compelled in escaping therefrom, to flow over its top, and there being sufficient water for the purpose, it presses against the under surface of the wing dam E or E' throughout its entire length and width. This larger dam-obstructed water chamber I is provided in its front end with a port K, for the outflow of water therefrom.

In use this cooler is set flat on a suitable support, and a supply of water from a source considerably above the cooler is introduced thereto through a tight pipe through the port G', and the water flows along the duct G around the end of the partition F and over the several dams H and out of the port K. The water fills all parts of the chamber B and contacts with the floor C and with the lower surfaces of the wing dams E and E' throughout their extent. The milk or cream is poured into the tray near its front end and runs around the several wing dams E E' in its course toward the point of its discharge over the apron C', and in its course it flows against and contacts with the side walls of the wing dams E and E', rising nearly to the top of these dams if the milk or cream is poured into the tray in sufficient quantity therefor. It will therefore be seen that the cold water, being constantly in contact with the under surface of the floor C and of the wing dams E E', is adapted to rapidly cool the milk or cream that is in contact with the upper surfaces of the floor C and the wing dams E and E' at the same time. It will also be noticed that by the peculiar construction of the device, the cold water is conducted directly to the floor of the tray near the point of discharge of the milk, or near the apron, so that the milk is affected first by the water near the front end of the tray after the water has lost some of its cold and is affected last by the water that is coldest, being just introduced to the device, near the apron or its point of discharge.

What I claim as my invention, and desire to secure by Letters Patent, is—

1. A milk or cream cooler, comprising a tray having transversely extending wing dams hollow and open to a water chamber beneath, and a tight water chamber under the tray provided with dams projecting up into the wing dams of the tray and compelling the water that flows over the dams to contact with the under surfaces of the wing dams, substantially as described.

2. In a milk or cream cooler, a tray provided with wing dams projecting alternately from the two opposite sides of the tray, said dams being open beneath and inversely substantially V-shaped in cross section, a tight water chamber below the tray, and transverse dams in the water chamber extending above the plane of the floor of the tray into the space beneath the wing dams and in the vertical planes of the axes of the wing dams, the dams in the water chamber being adapted to compel water flowing therein to pass over their tops and to contact with the under surfaces of the wing dams, substantially as described.

3. The combination of a tight water chamber having an inlet port, a water duct or passage along one wall thereof, from the inlet port nearly to the other end of the chamber, a plurality of transverse dams across the remainder of the chamber extending up into the space beneath the wing dams above, an outlet port, a tray secured water tight over the water chamber, hollow wing dams in the tray extending alternately from opposite sides of the tray and an apron formed of a continuation of its floor projecting from one end of the tray, substantially as described.

4. In a milk or cream cooler, a tray having an extended flat bottom and means for discharging the contents thereof at one end, and hollow wing dams opening downwardly and projecting up from the floor and extending alternately from opposite sides of the tray nearly across the tray, the wing dams being inversely substantially V-shaped in cross section, and a receptacle secured water tight beneath and to the tray, having inlet and outlet ports, forming a tight water chamber, which when filled with water holds the water against the bottom of the tray and against the under surfaces of the wing dams therein, as set forth.

In testimony whereof I affix my signature in presence of two witnesses.

LEWIS N. LEAN.

Witnesses:
J. A. ALLEN,
E. J. ALLEN.